April 11, 1967  M. WALTON  3,313,198

ONE-WAY SCREW FOR OPERATION WITH HIGH SPEED POWER TOOLS

Filed May 25, 1965

INVENTOR.
Marvin Walton
BY

United States Patent Office 3,313,198
Patented Apr. 11, 1967

3,313,198
ONE-WAY SCREW FOR OPERATION WITH
HIGH SPEED POWER TOOLS
Marvin Walton, 134 Tuscaloosa Ave.,
Atherton, Calif. 94025
Filed May 25, 1965, Ser. No. 458,604
3 Claims. (Cl. 85—45)

The present invention relates to one way screws, i.e., screws that can effectively be operated in one direction only and therefore cannot be withdrawn by conventional screw driving tools once they have been driven into position. Screws of this type are used in the construction of apparatus, or in the securement of apparatus to their places of use, when it is undesirable to have the apparatus disassembled or removed from their places of use by unauthorized or incompetent persons.

The heads of most screws of this type provide abutment surfaces in diametrically opposite areas thereof for effective engagement by a drive tool when the screw is to be driven into an object, and rearwardly of these abutment surfaces, i.e., in a direction opposite to the direction in which the screw is driven into position, the screw head is provided with camming ramps along which a drive tool is cammed out of engagement with the screw head when its operation is reversed. Hence, it is impossible to withdraw the screw by reversal of the screw driving means, once the screw has been driven into position.

The known one way screws exhibit many disadvantages. Some are of a complex construction and do not lend themselves to inexpensive mass production methods. Others are not easy to operate and present certain difficulties in practical use, especially when used in connection with power tools. Thus, when a high speed screw driving tool is applied to them with the tool in operation, it is often difficult and takes some time to engage the tool appropriately with the abutment surface of the screw head, and the screw head may be damaged and/or the operator's hand may be jarred. The same is true when operation of the tool is accidentally reversed. The tool may be pushed violently against the operator's hands or body and/or may jar the operator's hands, especially when the tool is no longer in perfect coaxial alignment with the screw.

It is an object of my invention to provide a one way screw that may smoothly be engaged by high speed tools and from which such tools may easily and smoothly be disengaged upon reversal in the operation of the tools, even though the tools may no longer be in precise axial alignment with the screw.

Another object of the invention is to provide a one way screw of the type referred to, that may readily be produced by mass production methods.

These and other objects of the invention will be apparent from the following description of the accompanying drawing which illustrates a preferred embodiment thereof and wherein.

Figure 3:
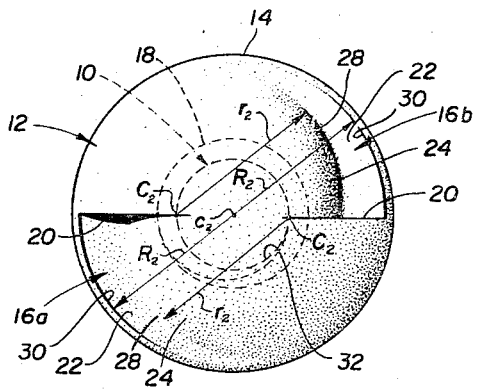
FIGURE 3 is a plan view of the screw shown in FIGURE 1.

The one way screw of the invention comprises a threaded stem 10 which carries a head 12 in the form of a smoothly rounded cap that has a circular base 14. Along diametrically opposite areas the head is provided with indentations or excisions 16a and 16b that end in the direction of the descent of the screw threads 18, i.e., the direction in which the screw has to be turned to be driven into the work, with abutment areas 20 disposed in a plane which is perpendicular to the base 14 of the screw head and contains the axis $x$—$x$ of the screw stem 10 (FIGURE 3). The floors of the excisions 16a and 16b form ramps 22 that lie in a plane parallel to the base 14 of the screw head and extend rearwardly from the abutment areas in a direction opposite to the direction in which the screw is to be operated. I have found that the described screw head may be effectively and smoothly engaged with, and disengaged from, high speed power tools without jarring the tool and/or the operator's hand, and without danger of marring the head of the tool, if the inner side walls 24 of the ramps curve gradually both in upward and in rearward direction (or to put it differently, both in a direction longitudinally of, and around the axis of the screw), in such a manner that they merge in both directions smoothly with the rounded top surface of the screw head.

Figure 2:
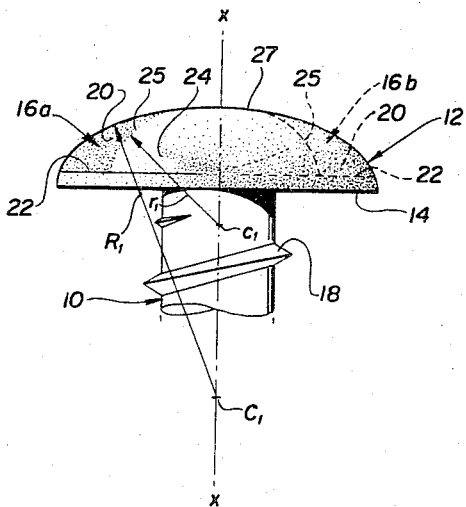
FIGURE 2 is a fragmentary side elevation thereof.
Figure 1:
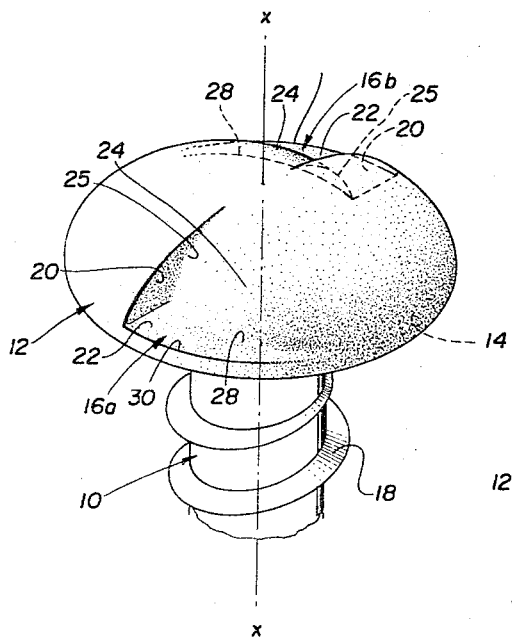
FIGURE 1 is a fragmentary perspective of a one way screw embodying my invention.

Having reference to FIGURES 1 and 2 the inner side wall 24 of each excision or indentation 20 curves in an upward direction in such a manner that it intersects the abutment area 20 of the excision along an arc 25 that has a shorter radius of curvature that the radius of the top surface of the screw head. In FIGURE 2 the letter $C_1$ identifies the approximate center point of the arc 27 defined by the intersection of the abutment areas with the top surface of the screw head (assuming said head to be a true sphere segment which it does not necessarily have to be) and the letter $R_1$ identifies the radius of said arc 27. The center point $C_1$ lies in the center axis $x$—$x$ of the screw stem as shown in FIGURE 2. The radius of the arcuate intersection line 25 of the side walls 24 of the ramps with the abutment areas 20 is identified by the letter $r_1$ and the geometrical center point of said arcuate intersection line 25 is identified by the letter $c_2$ and lies likewise in the center axis $x$—$x$ of the screw. The radius $r_1$ of the arcuate intersection line 25 is substantially shorter than the radius $R_1$ of the screw head. Hence, each of the abutment areas of the screw head are defined by curved lines 25 and 27 whose geometrical center points $C_1$ and $c_1$, respectively, lie on the same side and preferably in the center axis $x$—$x$ of the screw stem 10 but whose radii $R_1$ and $r_1$ are substantially different in length. The abutment areas therefore, resemble the upper horn of a crescent.

In addition to the described curvature the inner side wall 24 of each of the ramps is also curved in such a manner that it reaches, and smoothly merges with, the top surface of the screw head in a rearward direction. For this purpose the intersection line 28 of the ramp floor 22 with the side wall 24 forms an arc having approximately the same radius $r_2$ and a differently located geometrical center point $C_2$ than the circle 30 defined by intersection of the curved surface of the screw head with the plane of the ramp floors 22, which circle 30 has its center point $c_2$ located in the axis $x$—$x$ of the screw. Having reference to FIGURE 2, the radii $r_2$ of the arcs 28 are about equal and may be larger than the radius $R_2$ of the outer edge of the ramp floors, and while the center point $c_2$ of the circle 30 lies in the center axis $x$—$x$ of the screw as pointed out above, the geometrical center points $C_2$ of the two arcs 28 lie in areas radially remote from the center axis $x$—$x$ of the screw. In the particular embodiment of the invention illustrated in the accompanying drawing each of said center points $C_2$ coincides with the remote intersection point of the plane defined by the abutment areas 20, with a circle 32 that is concentric with the circle 30 and which happens to have a diameter equal to the diameter of the screw stem 10. In said embodiment, the radius $r_2$ of the intersection arc 28 is approximately equal to the radius $R_2$ of the circle 30. With the outer edges of the ramp floors 22 formed by segments of a circle 30 whose center point lies in the axis $x$—$x$ of the screw, and the intersection arcs 28 being parts of circles of approximately the same diameter as the diameter of the circle 30 and having geometrical center points $C_2$ that are radially displaced from the center axis $x$—$x$ of the screw along the intersection line of the plane defined by the edges of the ramp floors 22 and the plane defined by the abutment areas 20, the floors 22 of the ramps have the shape of the horns of crescents so positioned that their curved ends point in a direction away from the abutment areas 20.

I have found that when the ramps leading to the abutment surfaces are shaped in the described manner and the inner side surfaces of said ramps are curved about two centers as described to blend smoothly into the top surface of the screw head, both in a direction longitudinally of, and around, the screw axis, power tools may smoothly be engaged with, and disengaged from, the screw heads without chattering and without jarring the tools and/or the hands of the operator; and due to the circular conformation of the base of the screw heads, the screws may easily and cheaply be produced by mass production methods.

While I have described my invention with the aid of a particular embodiment thereof, it will be understood that the invention is not limited to the specific curvatures and radii nor the particular locations of the arc line centers shown by way of example, which may be departed from, without departing from the scope and spirit of the invention.

I claim:

1. A one way screw comprising a threaded stem carrying upon one end thereof a rounded head having a circular base, said head having excisions in diametrically opposite areas of its surface, each of said excisions forming an abutment area for engagement by the drive tool located in a plane containing the center axis of the screw and having a peripherally open ramp leading to said abutment area along a circle concentric with the axis of the screw and in a plane parallel to the base of the screw head, the inner side wall of said ramp being arranged to curve both in a direction longitudinally of, and around, the screw axis to merge smoothly with the surface of the screw head.

2. A one way screw comprising a threaded stem carrying upon its upper end a rounded head having a circular base and provided in its surface in diametrically opposite areas thereof excisions, each having an abutment in a plane containing the axis of the screw for engagement by the drive tool, and leading to said abutment area a ramp having a peripherally open floor and an inner side wall of such conformation and location as to impart to said floor the shape of the horn of a crescent, with its point located remote from said abutment area, said side wall being curved in such a manner as to merge smoothly with the surface of the rounded head both in an upward and a circumferential direction.

3. A one way screw comprising a threaded stem carrying upon one end thereof a rounded head having a circular base, said head having indentations located in diametrically opposite areas thereof, each having an abutment area for engagement by the drive tool located in a plane containing the axis of the screw, a ramp extending rearwardly from said abutment area along the periphery of the screw head and having an outwardly open floor in a plane parallel to the base of the screw head and an inner side wall, said side wall being arranged to merge smoothly in upward and rearward direction into the surface of the screw head along curvatures causing it to intersect said abutment area in an arc of lesser radius than the arc of the surface of the screw head and to intersect the ramp floor in an arc of approximately the same radius as the radius of the circle determined by the outer edge of the ramp floor but having a geometrical center point radially remote from the axis of the screw.

References Cited by the Examiner

UNITED STATES PATENTS

| 2,015,878 | 10/1935 | Trotter | 145—50.1 |
| 2,180,633 | 11/1939 | Holt | 85—45 |
| 3,134,292 | 5/1964 | Walton | 85—45 |

FOREIGN PATENTS

| 1,563 | 1912 | Great Britain. |
| 13,555 | 1913 | Great Britain. |
| 138,281 | 2/1920 | Great Britain. |

References Cited by the Applicant

UNITED STATES PATENTS

| 1,956,963 | 5/1934 | Salmen. |

CARL W. TOMLIN, *Primary Examiner.*

M. PARSONS, JR., *Assistant Examiner.*